US012320299B2

(12) United States Patent
Jagata et al.

(10) Patent No.: US 12,320,299 B2
(45) Date of Patent: Jun. 3, 2025

(54) COOLING AIR DELIVERY SYSTEM AND METHODS THEREOF

(71) Applicant: General Electric Company, Schenectady, NY (US)

(72) Inventors: Lakshmi Narasimharao Jagata, Bengaluru (IN); Prateek Jalan, Bengaluru (IN); Veeraraju Vanapalli, Bengaluru (IN); Atanu Saha, Bengaluru (IN); Scott Alan Schimmels, Miamisburg, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/869,060

(22) Filed: Jul. 20, 2022

(65) Prior Publication Data

US 2024/0026822 A1    Jan. 25, 2024

(51) Int. Cl.
*F02C 7/18*      (2006.01)
*F01D 5/08*      (2006.01)
*F04D 29/58*     (2006.01)

(52) U.S. Cl.
CPC ............... *F02C 7/18* (2013.01); *F02C 7/185* (2013.01); *F01D 5/081* (2013.01); *F04D 29/5826* (2013.01); *F04D 29/5833* (2013.01); *F05D 2220/323* (2013.01); *F05D 2260/213* (2013.01)

(58) Field of Classification Search
CPC .... F01D 5/28; F01D 5/081–084; F02D 7/185; F04D 29/124; F04D 29/582–5846; F02C 7/185; F05D 2220/3219
See application file for complete search history.

(56) References Cited

U.S. PATENT DOCUMENTS

| | | | |
|---|---|---|---|
| 5,297,386 A | 3/1994 | Kervistin | |
| 5,685,158 A * | 11/1997 | Lenahan | F01D 5/081 60/726 |
| 6,551,064 B1 * | 4/2003 | Mannava | F01D 5/286 29/889.7 |
| 7,000,404 B2 * | 2/2006 | Palmisano | F01D 25/12 60/806 |
| 7,823,389 B2 * | 11/2010 | Seitzer | F01D 11/24 60/785 |
| 7,993,102 B2 | 8/2011 | Desai et al. | |
| 10,018,360 B2 * | 7/2018 | Suciu | F01D 9/06 |
| 10,094,296 B2 * | 10/2018 | Schwarz | F02C 9/18 |
| 10,113,486 B2 * | 10/2018 | Mueller | F01D 5/02 |
| 10,208,668 B2 * | 2/2019 | Clegg | F02C 7/18 |
| 10,612,383 B2 | 4/2020 | Moniz et al. | |
| 10,837,288 B2 | 11/2020 | Suciu et al. | |
| 11,060,530 B2 | 7/2021 | Petrasko et al. | |
| 2016/0076379 A1 | 3/2016 | Forcier et al. | |
| 2017/0002834 A1 | 1/2017 | Powell et al. | |

FOREIGN PATENT DOCUMENTS

GB      2299378 A     10/1996

* cited by examiner

*Primary Examiner* — Stephanie Sebasco Cheng
(74) *Attorney, Agent, or Firm* — Dority & Manning, P.A.

(57) ABSTRACT

A gas turbine engine having a compressor section, a combustion section, and a turbine section in serial flow arrangement to define a diffuser cavity between the compressor section and the combustor section, and an aft cavity. A compressor discharge pressure duct fluidly draws air from the diffuser cavity, passes it through a heat exchanger to cool the air, and then supplies the cooled air to the aft cavity.

18 Claims, 6 Drawing Sheets

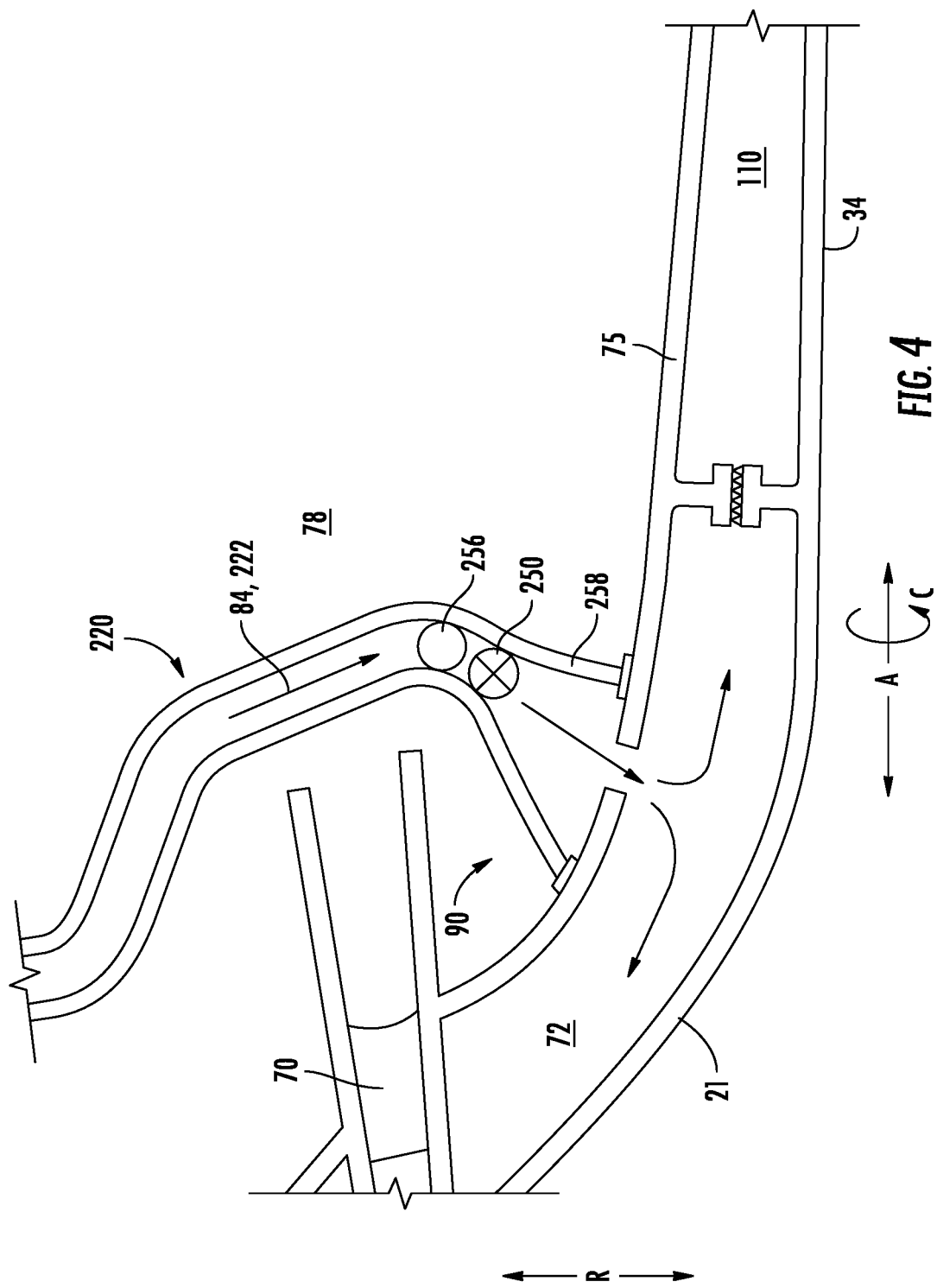

COOLING AIR DELIVERY SYSTEM AND METHODS THEREOF

FIELD

The present disclosure generally relates to a cooling air delivery system of a gas turbine engine.

BACKGROUND

A gas turbine engine generally includes a turbomachine and a rotor assembly. Gas turbine engines, such as turbofan engines, may be used for aircraft propulsion. In the case of a turbofan, the rotor assembly may be configured as a fan assembly.

In gas turbine engines, thermal management systems are incorporated to cool certain components and prevent damage due to overheating. In existing thermal management systems, air ducts passing through a combustion section of the gas turbine engine may be provided to provide a flow of cooling air to a turbine section of the gas turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 4 is a close-up view of a portion of the compressor section, combustion section, and cooling system of FIG. 2.

DETAILED DESCRIPTION

Figure 1:
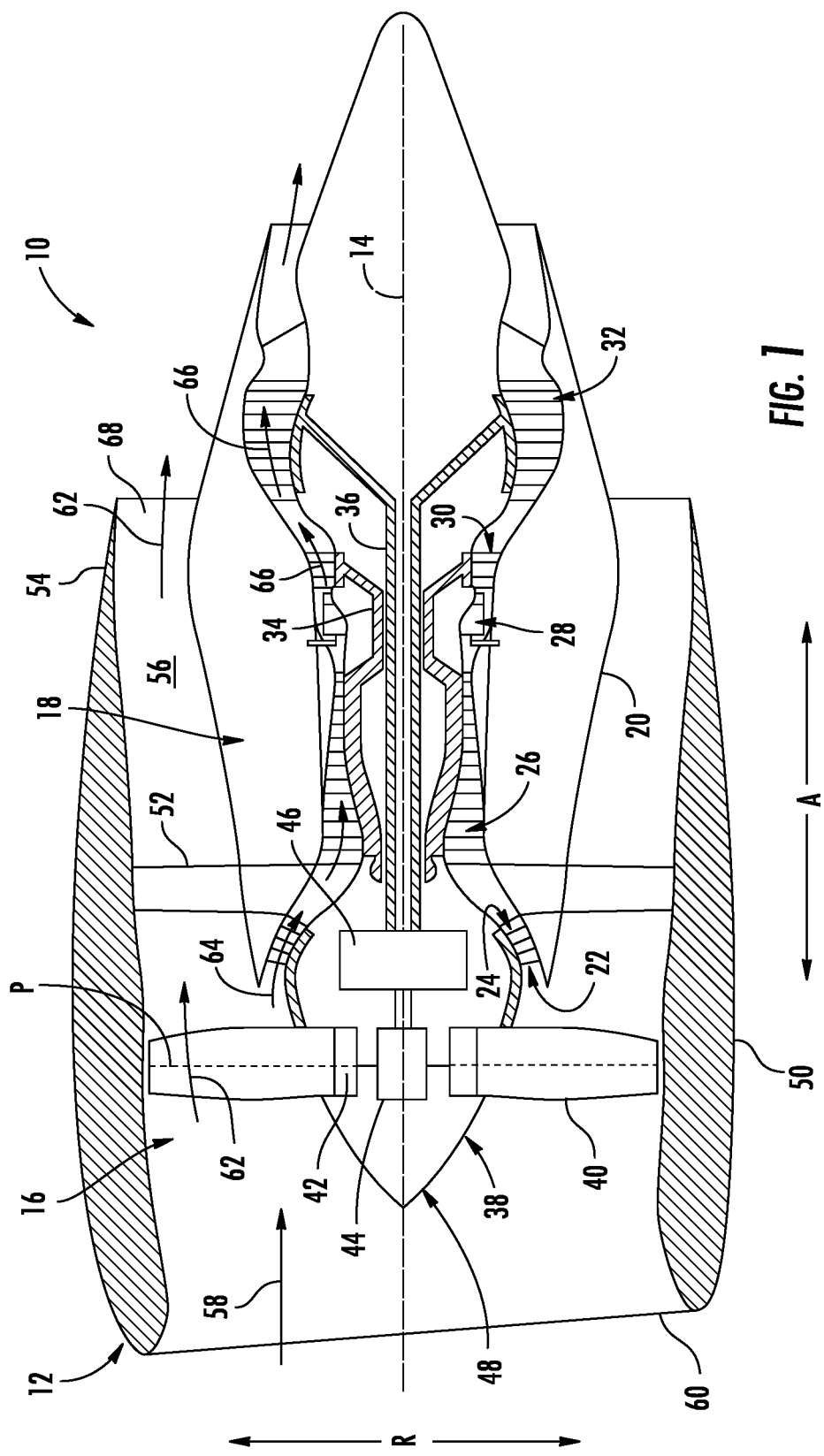
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled" refers to both direct coupling as well as indirect coupling through one or more intermediate components or features, unless otherwise specified herein.

The singular forms "a", "an", and "the" include plural references unless the context clearly dictates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include gas turbine engines, turboprop engines, turbojet engines, turboshaft engines, etc.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The term "rated speed" refers to an operating condition of an engine whereby the engine is operating in the maximum, full load operating condition that is rated by the manufacturer.

The term "standard day operating condition" refers to ambient conditions of sea level altitude, 59 degrees Fahrenheit, and 60 percent relative humidity.

The present disclosure is generally related to a cooling system for a gas turbine engine with a compressor section, a combustion section, and a turbine section. The cooling system may include air ducts that provide a flow of cooling air to one or more sections of the gas turbine engine to keep internal components of the gas turbine engine in an improved working environment. Accordingly, the inventors of the present disclosure have found that improvements to the cooling system would be beneficial.

The disclosure presents a cooling system that includes a compressor discharge pressure duct located outward of an outer combustor casing along a radial direction and in fluid communication with a diffuser cavity for receiving an airflow from the diffuser cavity; a heat exchanger in thermal communication with the compressor discharge pressure duct for reducing a temperature of the airflow; and a cooling duct located inward of the outer combustor casing along the radial direction and in fluid communication with the compressor discharge pressure duct for receiving the airflow. The cooling duct is further in fluid communication with an aft cavity for providing at least a portion of the airflow to the aft cavity. The aft cavity is defined in part by an inner combustor casing and a compressor section (e.g., a high-pressure compressor) of the gas turbine engine. In such a manner, the cooling system may provide cooled airflow to the aft cavity during operation of the gas turbine engine. The cooling system may further provide a second portion of the airflow to a turbine section of the gas turbine engine (e.g., a forward wheelspace cavity) for cooling, e.g., a stage 1 nozzle, high-pressure turbine rotor blades, etc.

As will be appreciated, it may generally be desirable to increase an overall pressure ratio (OPR, which is a ratio of a pressure at a forward end of the compressor to a pressure at an aft end of the compressor) of a gas turbine engine, e.g., in order to improve an overall efficiency of the gas turbine engine. With the increase in OPR, a compressor exit temperature may also increase, particularly at high power operating conditions (e.g., takeoff, climb, etc.). Inclusion of a cooling system of the present disclosure may allow for an increased OPR by providing the cooled airflow to, e.g., the aft cavity to cool the hotter components of the compressor section.

Further aspects of the present disclosure may allow for modulation of the airflow provided, e.g., to the aft cavity, such that the airflow is only provided when needed, improving an efficiency of the gas turbine engine.

Referring now to the drawings, wherein identical numerals indicate the same elements throughout the figures, FIG. 1 is a schematic, cross-sectional view of a propulsion system 10 in accordance with an exemplary embodiment of the present disclosure. More particularly, for the embodiment of FIG. 1, propulsion system 10 includes a gas turbine engine 12. In one example, gas turbine engine 12 may be a turbofan engine, such as a high-bypass gas turbine jet engine. As shown in FIG. 1, gas turbine engine 12 defines an axial direction A (extending parallel to longitudinal centerline 14 provided for reference) and a radial direction R. In general, gas turbine engine 12 includes a fan section 16 and a turbomachine 18 disposed downstream from fan section 16.

The exemplary turbomachine 18 depicted generally includes an outer casing 20 that defines an annular inlet 22 and is substantially tubular. Outer casing 20 encases, in serial flow order/relationship, a compressor section 23 including a booster or low-pressure compressor 24 and a high-pressure compressor 26; a combustion section 28; and a turbine section 29 including a high-pressure turbine 30 and a low-pressure turbine 32. A high-pressure shaft 34 drivingly connects high-pressure turbine to high-pressure compressor 26. A low-pressure shaft 36 drivingly connects low-pressure turbine 32 to low-pressure compressor 24.

For the embodiment depicted, fan section 16 includes a variable pitch fan 38 having a plurality of fan blades 40 coupled to a disk 42 in a spaced apart manner. As depicted, fan blades 40 extend outwardly from disk 42 generally along radial direction R. Each fan blade 40 is rotatable relative to disk 42 about a pitch axis P by virtue of fan blades 40 being operatively coupled to a suitable actuation member 44 configured to collectively vary the pitch of fan blades 40, e.g., in unison. Fan blades 40, disk 42, and actuation member 44 are together rotatable about longitudinal centerline 14 by low-pressure shaft 36 across a power gear box 46. Power gear box 46 includes a plurality of gears for stepping down the rotational speed of low-pressure shaft 36 to a more efficient rotational fan speed.

Referring still to the exemplary embodiment of FIG. 1, disk 42 is covered by a rotatable front hub 48 aerodynamically contoured to promote an airflow through the plurality of fan blades 40. Additionally, fan section 16 includes an annular fan casing or outer nacelle 50 that circumferentially surrounds variable pitch fan 38 and/or at least a portion of turbomachine 18. It should be appreciated that in some embodiments, nacelle 50 is configured to be supported relative to turbomachine 18 by a plurality of circumferentially spaced outlet guide vanes 52. Moreover, a downstream section 54 of nacelle 50 extends over an outer portion of turbomachine 18 so as to define a bypass airflow passage 56 therebetween.

During operation of gas turbine engine 12, a volume of air 58 enters gas turbine engine 12 through an associated inlet 60 of nacelle 50 and/or fan section 16. As the volume of air 58 passes across fan blades 40, a first portion of air 58 as indicated by arrows 62 is directed or routed into bypass airflow passage 56 and a second portion of air 58 as indicated by arrow 64 is directed or routed into low-pressure compressor 24. The ratio between first portion of air 62 and second portion of air 64 is commonly known as a bypass ratio. The pressure of second portion of air 64 is then increased as it is routed through high-pressure compressor 26 and into combustion section 28, where it is mixed with fuel and burned to provide combustion gases 66. Subsequently, combustion gases 66 are routed through high-pressure turbine and low-pressure turbine 32, where a portion of thermal and/or kinetic energy from combustion gases 66 is extracted.

Combustion gases 66 are then routed through combustion section 28 of turbomachine 18 to provide propulsive thrust. Simultaneously, the pressure of the first portion of air 62 is substantially increased as first portion of air 62 is routed through bypass airflow passage 56 before it is exhausted from fan nozzle exhaust section 68 of gas turbine engine 12, also providing propulsive thrust.

It should be appreciated, however, that gas turbine engine 12 depicted in FIG. 1 is by way of example only, and that in other exemplary embodiments, aspects of the present disclosure may additionally, or alternatively, be applied to any other suitable gas turbine engine. For example, in other exemplary embodiments, gas turbine engine 12 may instead be any other suitable aeronautical gas turbine engine, such as a turbojet engine, turboshaft engine, turboprop engine, etc. Additionally, in still other exemplary embodiments, gas turbine engine 12 may include or be operably connected to any other suitable accessory systems, may be configured as a single spool engine or a three spool engine, etc.

Figure 2:
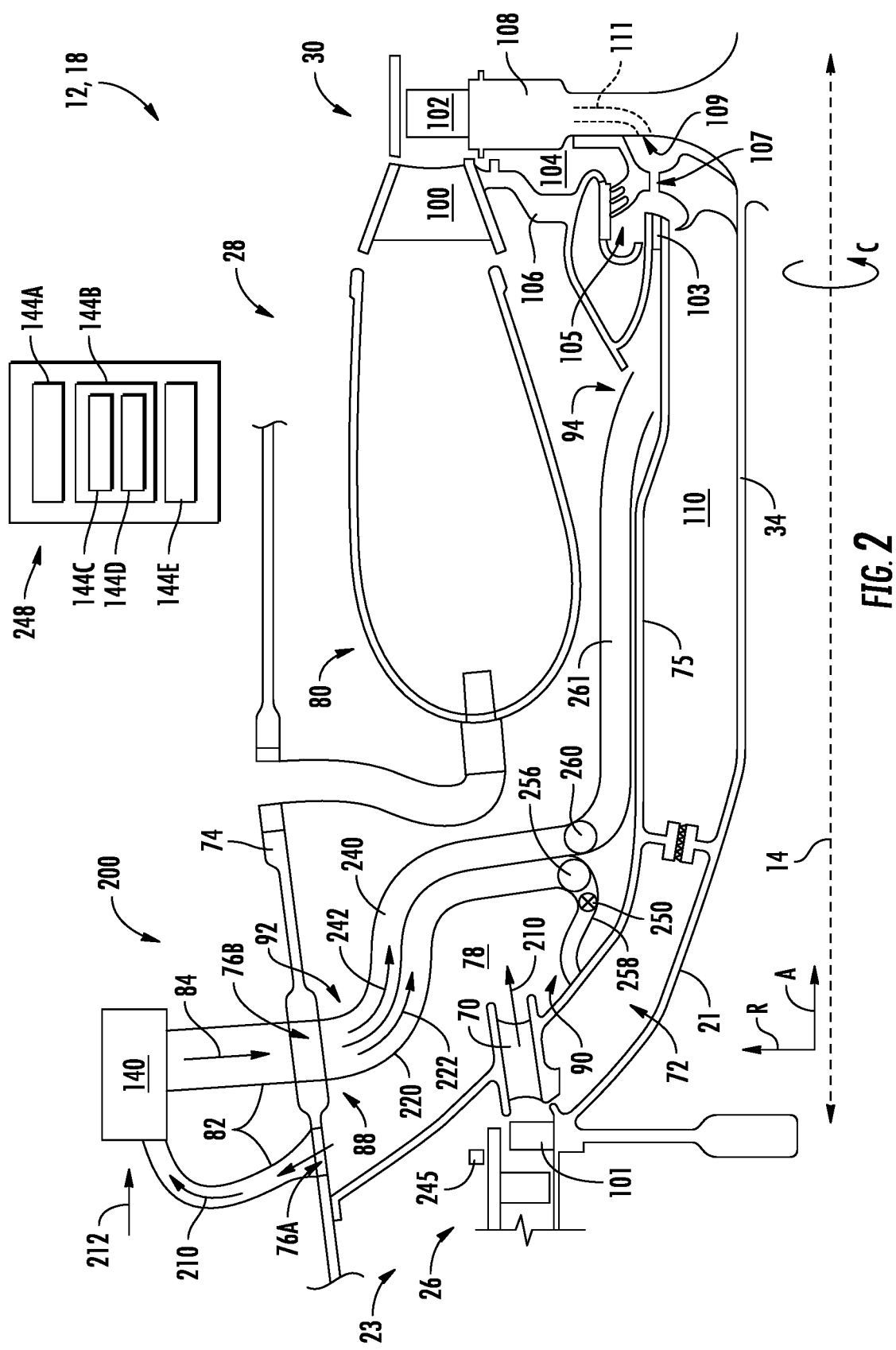
FIG. 2 is a cross-sectional view of a compressor section and a combustion section of the exemplary gas turbine that shows a cooling system in accordance with an exemplary aspect of the present disclosure.

Referring now to FIG. 2, FIG. 2 is a cross-sectional view of a portion of turbomachine 18 and shows high-pressure compressor 26, combustion section 28, and high-pressure turbine 30. The turbomachine 18 is shown with a forward direction to the left and an aft direction to the right (not labeled).

As shown in FIG. 2, high-pressure compressor 26 includes a diffuser nozzle and defines an aft cavity 72. Diffuser nozzle 70 is disposed at an aft end of high-pressure compressor 26 and straightens or re-directs a flow of air flowing from high-pressure compressor 26 to combustion section 28. Aft cavity 72 is also disposed at an aft end of high-pressure compressor 26 and stores and supplies, e.g., cooling air for use by high-pressure compressor 26. More specifically, for the embodiment shown, the turbomachine 18 includes the high-pressure shaft 34, the high-pressure compressor 26 includes an aft cone 21 connecting the high-pressure shaft 34 to, e.g., rotor blades of the high-pressure compressor 26 (see FIG. 1), and the combustion section 28 includes an inner combustor casing 75. The inner combustor casing 75 and aft cone 21 together define at least in part the aft cavity 72.

Combustion section 28 further includes an outer combustor casing 74 and a combustor 80. The outer combustor casing 74 is generally outward of the combustor along the radial direction R and the inner combustor casing 75 is generally inward of the combustor 80 along the radial direction R. The outer combustor casing 74 of combustion section 28 defines at least one fluid opening 76 and, at least in part, a chamber configured to house the combustor 80, referred to herein as a diffuser cavity 78.

The gas turbine engine 12 further includes a cooling system 200 that includes a heat exchanger 140 and a compressor discharge pressure ("CDP") duct 82 for carrying compressor discharge air 210 to the heat exchanger 140. Generally, "compressor discharge air" refers to pressurized air generated by a compressor, such as the high-pressure compressor 26, during operation. The heat exchanger 140 may use a cooling fluid 212 to cool the compressor discharge air 210. The cooling fluid 212 may be, e.g., a supercritical fluid, such as a supercritical $CO_2$ ("$sCO_2$"). However, in other embodiments any other suitable cooling fluid may be utilized.

Moreover, the at least one fluid opening 76 defined by the outer combustor casing 74 includes a first fluid opening 76A and a second fluid opening 76B. The first and second fluid openings 76A, 76B each extend through a portion of the outer combustor casing 74. The CDP duct 82 extends generally from the first fluid opening 76A to the second fluid opening 76B.

In addition to the CDP duct 82, the cooling system 200 also includes a cooling duct. More specifically, the cooling system 200 also includes a first cooling duct 220 and a second cooling duct 240. The first cooling duct 220 and the second cooling duct 240 are in fluid communication with the CDP duct 82 through the at least one fluid opening 76, and more specifically through the second fluid opening 76B in the embodiment depicted.

Briefly, the CDP duct 82, the first cooling duct 220, and the second cooling duct 240 are pipes or conduits. However, in other embodiments, any suitable structure may be provided for the respective ducts to transport a fluid flow.

As noted, the CDP duct 82 is connected to at least a portion of the outer combustor casing 74 and is also in fluid communication with the first fluid opening 76A in the outer combustor casing 74. The first fluid opening 76 is configured to communicate a flow 84 of cooled air from the heat exchanger 140 through the outer combustor casing 74 into the first cooling duct 220 and/or the second cooling duct 240. The second fluid opening 76B may be a single opening or may be multiple openings.

More specifically, for the embodiment depicted, the first fluid opening 76A is in fluid communication with the diffuser cavity 78 for receiving the compressor discharge air 210 from the diffuser cavity 78 and providing such airflow to and through the CDP duct 82. The second fluid opening 76B is in fluid communication with the CDP duct 82 and heat exchanger 140 for providing a flow 84 of cooled air from the heat exchanger 140 to the remaining portions of the cooling system 200 (e.g., the first cooling duct 220 and the second cooling duct 240).

It will be appreciated, however, that in other exemplary embodiments, the CDP duct 82 may instead extend from the compressor section 23 to the heat exchanger 140, and to the at least one fluid opening 76. For example, a portion of CDP duct 82 may alternatively be configured to receive compressor bleed airflow from a location within the compressor section 23.

Referring still to FIG. 2, the first cooling duct 220 and/the second cooling duct 240 extend through a portion of diffuser cavity 78 and pass between high-pressure compressor 26 and the combustor 80. The first cooling duct 220 and/or the second cooling duct 240 are configured to transport a first flow of cooled air 222 and/or a second flow of cooled air 242, respectively, from the at least one fluid opening 76 and to one or more sections of the gas turbine engine 12. In certain exemplary embodiments, the first cooling duct 220 and/or the second cooling duct 240 can deliver the first flow of cooled air 222 and/or the second flow of cooled air 242 to a portion of or to components of the gas turbine engine 12, e.g., to components relating to the high-pressure turbine 30. In additional embodiments, the first cooling duct 220 and/or the second cooling duct 240 may further include transporting the first flow of cooled air 222 and/or the second flow of cooled air 242 through the diffuser cavity 78 before or after transporting the first flow of cooled air 222 and/or the second flow of cooled air 242 to the one or more sections of the gas turbine engine 12.

As used herein, the first flow of cooled air 222 and/or the second flow of cooled air 242, may be denoted collectively as flow 84 of cooled air, such that the first flow of cooled air 222 may be referred to as a first portion of flow 84, and the second flow of cooled air 242 may be referred to as a second portion of flow 84. The flow 84 of cooled air, and subsequently, the first flow of cooled air 222 and the second flow of cooled air 242, is a flow of cooled cooling air from a cooled cooling air heat exchanger, e.g., heat exchanger 140, into the gas turbine engine 12. It will be appreciated, however, that in other exemplary embodiments, flow 84 of cooled air can come from other sources of cooling air such as an ambient source, a bleed air source, a thermal management system of propulsion system 10, or other air sources.

In this example, a first end 88 of the first cooling duct 220 is disposed proximate to a portion of the outer combustor casing 74 that surrounds the second fluid opening 76B and a second end 90 of the first cooling duct 220 is positioned proximate the aft cavity 72. Similar, a first end 92 of the second cooling duct 240 is positioned proximate the outer combustor casing 74 that surrounds the second fluid opening 76B and a second end 94 is positioned proximate the HP turbine 30. As used herein, the term "proximate" refers to being closer to one object than another object (e.g., closer to the outer combustor casing 74 than the HP turbine 30).

In the depicted embodiment, the high-pressure turbine 30 includes an inlet guide vane 100 and a first stage blade 102. In FIG. 2, a single inlet guide vane 100 and the first stage blade 102 are shown. However, it will be appreciated that gas turbine engine 12 includes a plurality of inlet guide vanes 100 and a plurality of first blades including the first stage blade 102 extending around a circumferential direction of longitudinal centerline 14 (see also, FIG. 3A). Inlet guide vane 100 is a stationary airfoil for guiding or redirecting a flow of fluid passing across inlet guide vane 100. Here, inlet guide vane 100 straightens a or changes a direction of a flow of combustion gasses passing from combustion section 28 to high-pressure turbine 30. First stage blade 102 is an airfoil configured to rotate (e.g., with a rotor disk 108) about longitudinal centerline 14. For example, as combustion gasses are expelled from combustor 80, the combustion gasses push against the first stage blade 102, causing the first stage blade 102 to rotate about longitudinal centerline 14.

In between inlet guide vane 100 and the first stage blade 102, a forward wheelspace cavity 104 is formed. More specifically, in at least certain exemplary aspects, forward wheelspace cavity 104 is defined and formed by components corresponding to inlet guide vane 100 and the first stage blade 102, such as a frame 106 supporting inlet guide vane 100 and rotor disk 108 to which first stage rotor blade is attached.

Further, the gas turbine engine 12 may include an assembly for providing flow 84 of cooled air from the second cooling duct 240 to the rotor disk 108 and first stage turbine blades 102. More specifically, frame 106 includes a nozzle 103 configured to turn the flow of flow 84 of cooled air from the second cooling duct 240 to at least partially match a rotation of the rotor disk 108. Further, rotor disk 108 includes a rotating seal 105 rotatable therewith. The air from nozzle 103 is then provided through an opening 107 defined in the rotating seal 105 to an inlet 109 to an internal cooling duct 111 (depicted in phantom) defined within the rotor disk 108. Flow 84 of cooled air may then be provided through the rotor disk 108 to the first stage turbine blades 102.

Combustion section 28 also defines a forward shaft outer cavity 110. Forward shaft outer cavity 110 is disposed generally inward along radial direction R from the second cooling duct 240. Forward shaft outer cavity 110 is fluidly connected to high-pressure turbine 30 via forward wheelspace cavity 104, and is further separated from the aft cavity 72 by the rotating seal 105. The forward shaft outer cavity 110 may allow for a flow of air that leaks through a seal between the forward shaft outer cavity 110 and the aft cavity 72 (not labeled) to travel to the forward wheelspace cavity 104. In such a manner, forward shaft outer cavity 110 may be referred to as a purge air flowpath, extending from the aft cavity 72 to the forward wheelspace cavity 104.

As already mentioned, the cooling system 200 discussed herein includes the first cooling duct 220 and the second cooling duct 240. The first cooling duct 220 and the second cooling duct 240 may present as two separate circuits for flow 84 of cooled air that reduces a temperature within particular sections of the gas turbine engine 12, e.g., high-pressure compressor section 26, combustion section 28, and/or high-pressure turbine section 30. A reduction in temperature provided by the cooling system 200 may preserve the longevity of the components within the gas turbine engine 12 and help maintain efficiency in operation of the gas turbine engine 12. Additionally, it will be appreciated that although the first cooling duct 220 and the second cooling duct 240 are shown directly adjacent, e.g., without a gap along the length of each duct in FIG. 2, the first cooling duct 220 and the second cooling duct 240 may be separated by a gap for at least a part of the length of each duct, or alternatively may share a common duct for at least a portion of a length of the first duct 220 (e.g., splitting into separate ducts at a manifold).

Referring still to FIG. 2, the first cooling duct 220 includes a first manifold 256 extending in a circumferential direction C and a first duct branch 258 extending from the first manifold 256 to the aft cavity 72 (or rather to the inner combustor casing 75). Although a single first duct branch 258 is depicted, the first cooling duct 220 may include a plurality of first duct branches 258 spaced along the circumferential direction C (see, e.g., FIGS. 3A and 3B).

Similarly, the second cooling duct 240 includes a second manifold 260 extending in a circumferential direction C and a second duct branch 261 extending from the second manifold 260 towards the HP turbine. Although a single second duct branch 261 is depicted, the second cooling duct 240 may include a plurality of second duct branch 261 spaced along the circumferential direction C (see, e.g., FIGS. 3A and 3B).

Figure 3A:
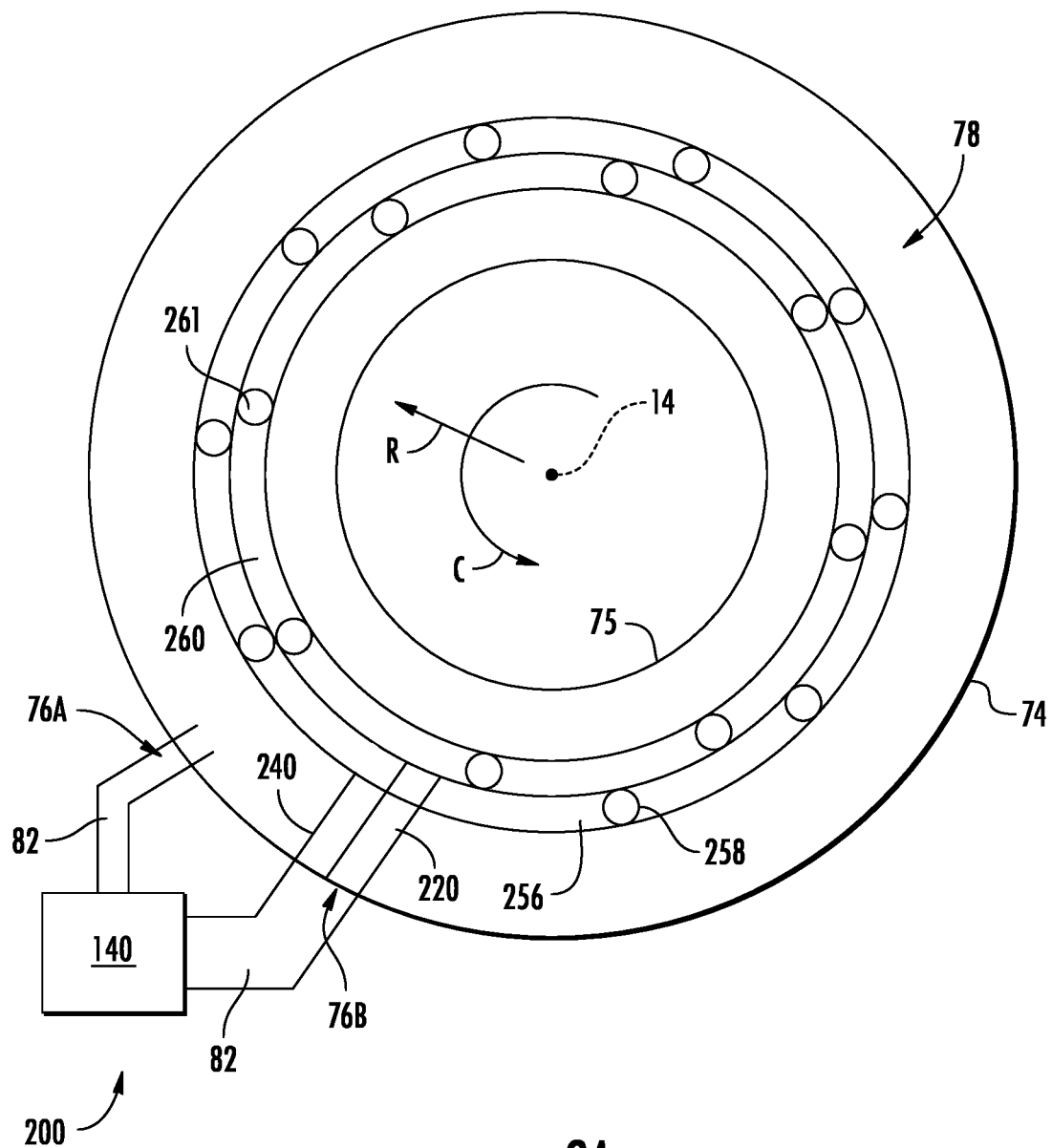
FIG. 3A is a schematic, cross-sectional view of the cooling system of FIG. 2.

Referring now briefly to FIG. 3A, a cross-sectional, schematic view is provided of the cooling system 200 and diffuser cavity 78 of FIG. 2, as taken through the first and second manifolds 256, 260. As shown, for the embodiment depicted, the first manifold 256 extends in the circumferential direction C, and more specifically, extends 360 degrees in the circumferential direction C about the longitudinal centerline 14 of the gas turbine engine 12. The first cooling duct 220 includes a plurality of the first duct branches 258 (depicted schematically) extending from the first manifold 256 and spaced along the circumferential direction C. Similarly, the second manifold 260 extends in the circumferential direction C, and more specifically, extends 360 degrees in the circumferential direction C about the longitudinal centerline 14 of the gas turbine engine 12. The second cooling duct 240 includes a plurality of the second duct branches 261 (depicted schematically) extending from the second manifold 260 and spaced along the circumferential direction C.

However, in other embodiments, the cooling system 200 may be configured in any other suitable manner. For example, referring now to FIG. 3B, a cross-sectional, schematic view is provided of a cooling system 200 and diffuser cavity 78 in accordance with another exemplary embodiment of the present disclosure is provided, as taken through a first manifold 256 and a second manifold 260. The exemplary cooling system 200 of FIG. 3B is configured in a similar manner as the exemplary cooling system 200 of FIG. 3A, and the same or similar numbers may refer to the same or similar parts.

Figure 3B:
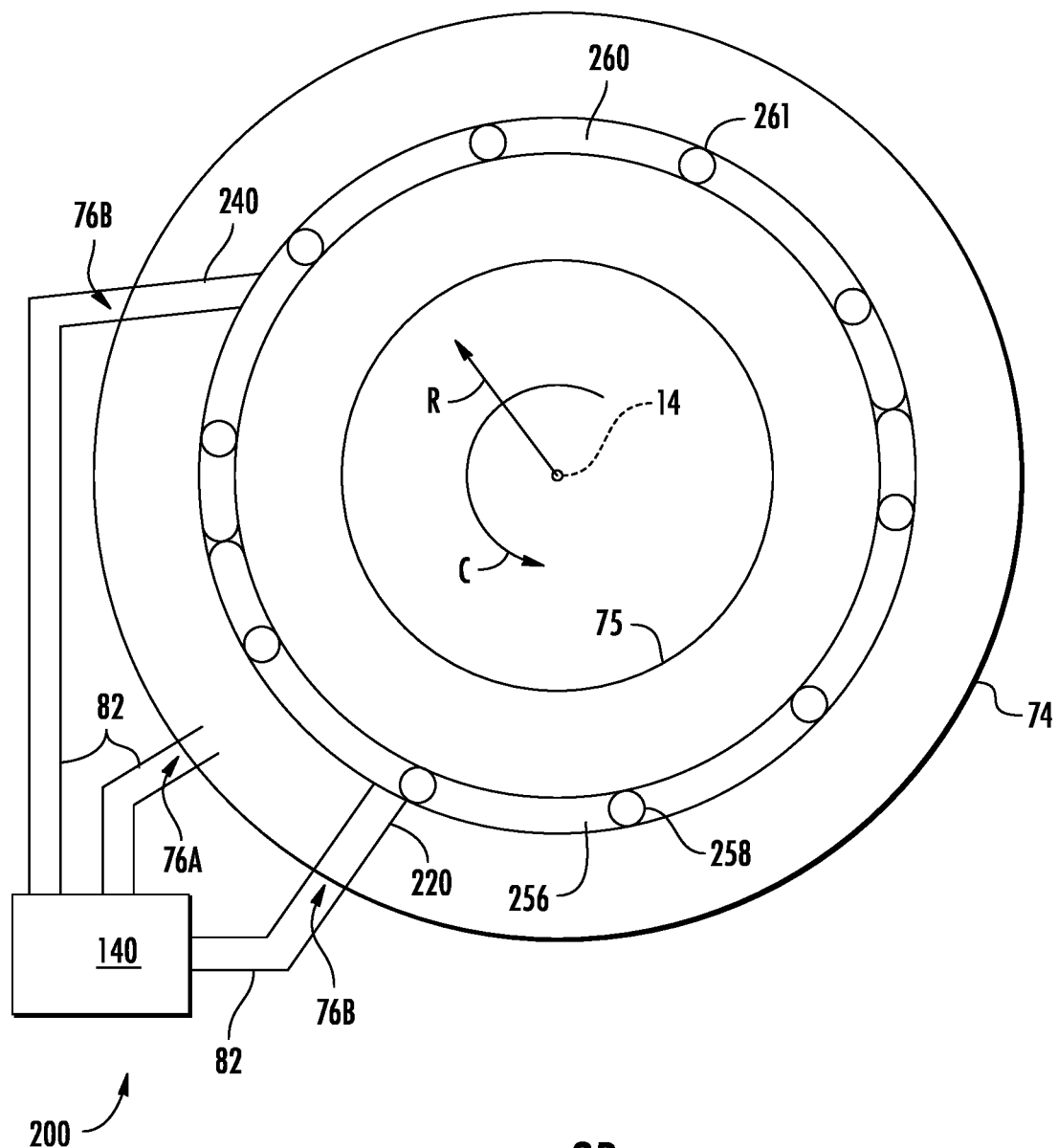
FIG. 3B is a schematic, cross-sectional view of a cooling system in accordance with another exemplary aspect of the present disclosure.

However, for the embodiment of FIG. 3B, the first manifold 256 of a first cooling duct 220 extends less than 360 degrees in a circumferential direction C about a longitudinal centerline 14 of the gas turbine engine 12, and similarly the second manifold 260 of a second cooling duct 240 also extends less than 360 degrees in the circumferential direction C about the longitudinal centerline 14 of the gas turbine engine 12. In particular, for the embodiment depicted, the first manifold 256 extends between 30 degrees and 270 degrees, such as between 90 degrees and 200 degrees, such as between 120 degrees and 180 degrees. Similarly, for the embodiment depicted, the second manifold 260 extends between 30 degrees and 270 degrees, such as between 90 degrees and 200 degrees, such as between 120 degrees and 180 degrees.

Referring now back to FIG. 2 and also to FIG. 4, a close-up, cross-sectional view of a portion of the turbomachine 18 is shown including a portion of the cooling system 200 of FIG. 2. In particular, FIG. 4 provides a close-up view of the first cooling duct 220.

In the embodiment depicted, the first cooling duct 220 is configured to transport the first flow of cooled air 222 to the high-pressure compressor 26. More specifically, the first cooling duct 220 is configured to transport the first flow of cooled air 222 to the aft cavity 72, where the aft cavity 72 is disposed at an aft end of the high-pressure compressor 26 (see FIG. 2), as described above. As the high-pressure compressor 26 may experience relatively extreme operating conditions (e.g., high temperatures and high-pressures, coupled with high rotational speeds), being able to reduce the temperature within the high-pressure compressor 26 or of one or more components supporting the high-pressure compressor 26 would improve efficiency and longevity of the gas turbine engine 12.

Additionally, in some exemplary embodiments, the first cooling duct 220 may be configured to provide the first flow of cooled air 222 to the aft cavity 72. The first flow of cooled air 222 travels along the aft cone 21 and up to an aft-most stage of HP compressor rotor blades 101 of the high-pressure compressor 26 (see FIG. 2). The first flow of cooled air 222 may be provided through a bore of the aft-most stage and into the HP compressor rotor blades 101 (e.g., in a similar manner as the airflow travels into the first stage blade 102, described above with reference to FIG. 2). In such a manner, the first flow of cooled air 222 may reduce the temperature of the HP compressor rotor blades 101 during operation of the gas turbine engine 12 at an engine condition (e.g., as compared to when the cooling system 200 is not operating at the same engine condition).

Additionally, for the embodiment depicted the second cooling duct 240 is in fluid communication with the high-pressure turbine 30 of the turbine section 29 for cooling the high-pressure turbine 30 of the turbine section 29. As mentioned above, the high-pressure turbine 30 includes an inlet guide vane 100 and a first stage blade 102, with the inlet guide vane 100 and the first stage blade 102 defining a forward wheelspace cavity 104. In some embodiments, the second cooling duct 240 is configured to transport the second flow of cooled air 242 to the forward wheelspace cavity 104 to cool the forward wheelspace cavity 104 and/or the high-pressure turbine 30. As mentioned above regarding the high-pressure compressor 26, cooling the high-pressure turbine 30 may also help improve efficiency and longevity of the gas turbine engine 12.

Additionally, a portion of the first flow of cooled air 222 flows (and, in some embodiments, leaks) from the aft cavity 72 into the forward wheelspace cavity 104. In particular, in the embodiment depicted, the gas turbine engine 12 includes a seal 264 positioned between the inner combustor casing 75 and the high-pressure shaft 34. A portion of the cooled air 222 may flow through the seal 265 to the forward shaft outer cavity 110, and through the forward shaft outer cavity 110 to the high-pressure turbine 30.

However, it will be appreciated that the first cooling duct 220 and the second cooling duct 240 may be rerouted to transport the first flow of cooled air 222 and/or the second flow of cooled air 242 to other parts of the gas turbine engine 12, such as other sections of the gas turbine engine 12 that may be subject to extreme operating conditions. For example, the cooling system 200 may be used to cool a last stage rotor blade, e.g., the compressor rotor blade 101 in FIG. 2. In other embodiments, the cooling system 200 may additionally and/or alternatively be used to cool other components of the gas turbine engine 12.

The range of cooling of the cooling system 200 depends at least in part on the material of the section in which the cool air is being delivered to. For example, the first flow of cooled air 222 is being transported to the high-pressure compressor 26, and in particular to the aft cavity 72, in the embodiment depicted. The high-pressure compressor 26 includes components exposed to a working gas flowpath through the turbomachine 18 (e.g., the aft-most stage of high-pressure compressor rotor blades 101; see FIG. 2) formed of a material, the material having a material temperature limit. "Material temperature limit" as used herein may refer to the highest temperatures that a material can withstand without damage (e.g., inelastic damage under normal loads, such as creep; changes in chemical structures; premature degradation). In the embodiment depicted, when the gas turbine engine is operated at a rated speed during standard day operating conditions, the cooling system 200 is configured to provide the first flow of cooled air 222 through the first cooling duct 220 at a temperature (in degrees F.) 85% or less of the material temperature limit, such as 70% or less, such as 55% or less, such as 40% or less, such as 30% or less. The range of cooling of the cooling system 200 may additionally depend at least in part on the percentage of the flow 84 that can be transported through the cooling system 200. For example, as noted, the component may be the aft-most stage of HP compressor rotor blades, and the material temperature limit may be ranging from 1200 degrees F. to 1400 degrees F.

Referring still to FIGS. 2 and 4, it will be appreciated that in some exemplary embodiments, at least one of the first cooling duct 220 and the second cooling duct 240 is modulated, e.g., adjustable. For example, the cooling system 200 generally includes at least one sensor 245 for sensing compressor exit temperature is included in the cooling system 200 and a controller 248 operably connected to the sensor 245 (see FIG. 2). The sensor 245 may be configured to sense data indicative of a temperature and/or a pressure within the compressor section 23, a rotational speed of one or more aspects of the compressor section 23, etc. In particular, the sensor 245 may be configured to sense data indicative of one or more operative conditions of the gas turbine engine 12. It will be appreciated that, in additional or alternative embodiments, the at least one sensor 245 may include a plurality of sensors, such as two or more sensors, such as three or more sensors, and/or such as four or more sensors. In addition, the plurality of sensors may be located throughout the interior of the gas turbine engine 12 in order to sense data indicative of the temperature in specific sections of the gas turbine engine 12.

Also, as shown in FIG. 4, the cooling system 200 further includes at least one valve 250. The at least one valve 250 may operate based on the operative conditions sensed by the sensor 245. The controller 248 may also be operably coupled to the at least one sensor 245 and the at least one valve 250.

In the embodiment depicted, the valve 250 is positioned in the first duct branch 258 of the first cooling duct 220, and one or more seals 252A, 252B are provided where the first duct branch 258 couples with the inner combustor casing 75. In such a manner, the cooling system 200 may include a plurality of valve 250, with each valve 250 of the plurality of valves 250 in a respective first duct branch 258.

Notably, in other exemplary embodiments, however, the valve 250 may be located upstream of the first duct manifold 256.

As noted, the exemplary controller 248 depicted in FIGS. 2 and 4 is configured to receive the data sensed from the at least one sensor 245 and, e.g., may make control decisions for the cooling system 200 based on the received data. In one or more exemplary embodiments, the controller 248 depicted in FIG. 2 may be a stand-alone controller 248 for the cooling system 200, or alternatively, may be integrated into one or more of a controller for the gas turbine engine 12 with which the cooling system 200 is integrated, a controller for an aircraft including the gas turbine engine 12 with which the cooling system 200 is integrated, etc.

Referring particularly to the operation of the controller 248, in at least certain embodiments, the controller 248 can include one or more computing device(s) 144. The computing device(s) 144 can include one or more processor(s) 144A and one or more memory device(s) 144B. The one or more processor(s) 144A can include any suitable processing device, such as a microprocessor, microcontroller, integrated circuit, logic device, and/or other suitable processing device. The one or more memory device(s) 144B can include one or more computer-readable media, including, but not limited to, non-transitory computer-readable media, RAM, ROM, hard drives, flash drives, and/or other memory devices.

The one or more memory device(s) 144B can store information accessible by the one or more processor(s) 144A, including computer-readable instructions 144C that can be executed by the one or more processor(s) 144A. The instructions 144C can be any set of instructions that when executed by the one or more processor(s) 144A, cause the one or more processor(s) 144A to perform operations. In some embodiments, the instructions 144C can be executed by the one or more processor(s) 144A to cause the one or more processor(s) 144A to perform operations, such as any of the operations and functions for which the controller 248 and/or the computing device(s) 144 are configured, the operations for operating the cooling system 200 (e.g., method 300), as described herein, and/or any other operations or functions of the one or more computing device(s) 144. The instructions 144C can be software written in any suitable programming language or can be implemented in hardware.

Additionally, and/or alternatively, the instructions 144C can be executed in logically and/or virtually separate threads on processor(s) 144A. The memory device(s) 144B can further store data 144D that can be accessed by the processor(s) 144A. For example, the data 144D can include data indicative of power flows, data indicative of engine/aircraft operating conditions, and/or any other data and/or information described herein.

The computing device(s) 144 can also include a network interface 144E used to communicate, for example, with the other components of the cooling system 200 (e.g., via a communication network). The network interface 144E can include any suitable components for interfacing with one or more network(s), including for example, transmitters, receivers, ports, controllers, antennas, and/or other suitable components. One or more devices can be configured to receive one or more commands from the computing device(s) 144 or provide one or more commands to the computing device(s) 144.

The network interface 144E can include any suitable components for interfacing with one or more network(s), including for example, transmitters, receivers, ports, controllers, antennas, and/or other suitable components. The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The operative conditions sensed by the at least one sensor 245 may include at least one of the following: a high operating temperature condition; a high-pressure condition; a supersonic cruise condition; and a takeoff condition or a climb condition. The high operating temperature condition may refer to an internal temperature of a section of the gas turbine engine 12 where the internal temperature extremely high, e.g., when the temperature is over 1000 degrees Fahrenheit, over 1200 degrees Fahrenheit, over 1300 degrees Fahrenheit, over 1302 degrees Fahrenheit, and/or over 1306 degrees Fahrenheit. Additionally, if the gas turbine engine 12 is in the supersonic cruise mode for a significant amount of time, the valve 250 may be activated to cool the sections of the gas turbine engine 12 in need of cooling. Further, when the gas turbine engine 12 is in takeoff mode, e.g., where lots of air may be needed to provide enough thrust for the propulsion system 10, there may be a built up in pressure and/or increased temperatures within the high-pressure compressor section 26, where cooling air would be helpful.

Figure 5:
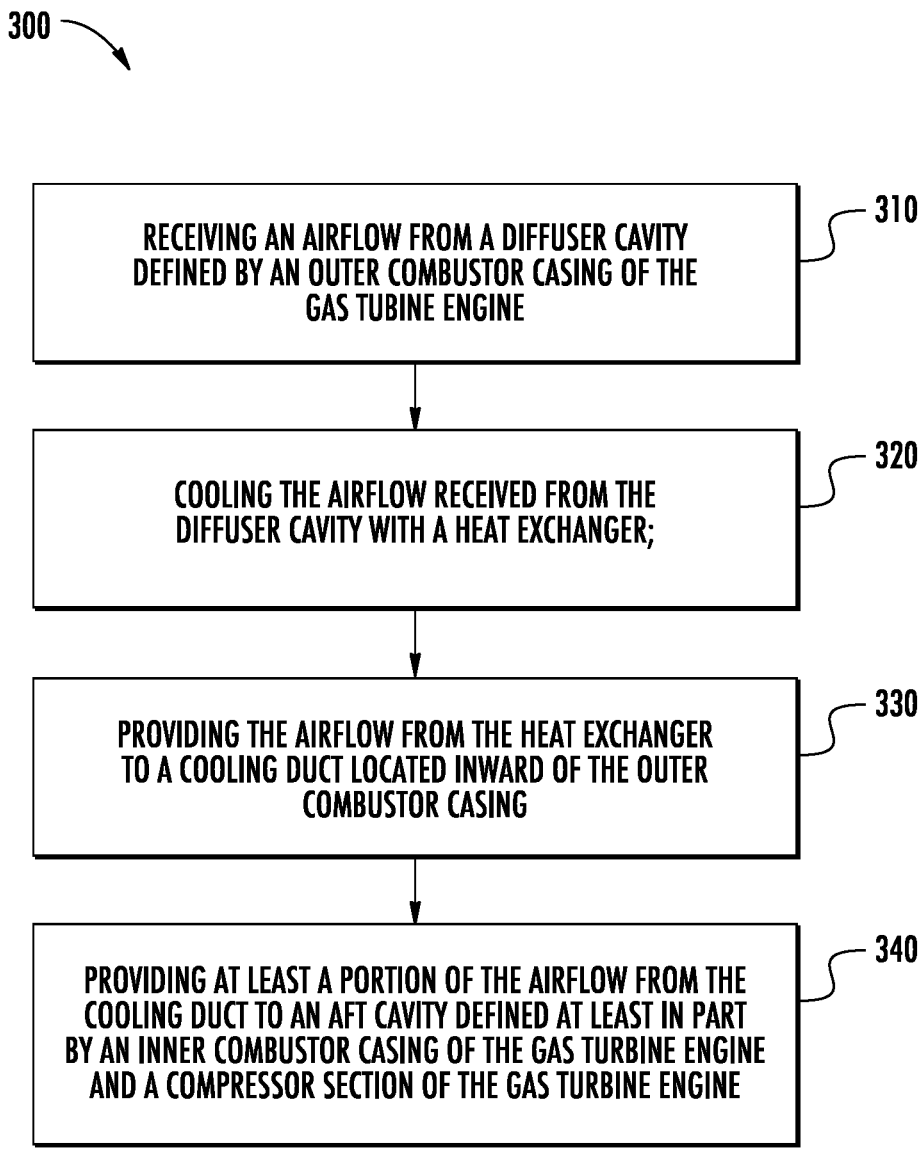
FIG. 5 is a flowchart of a method in accordance with an exemplary aspect of the present disclosure.

Referring now to FIG. 5, a flowchart of a method 300 of managing thermal energy in the gas turbine engine 12 is shown. The method 300 generally includes, at 310, receiving an airflow from a diffuser cavity defined by an outer combustor casing of the gas turbine engine; at 320, cooling the airflow received from the diffuser cavity with a heat exchanger; at 330, providing the airflow from the heat exchanger to a cooling duct located inward of the outer combustor casing; and at 340, providing at least a portion of the airflow from the cooling duct to an aft cavity defined at least in part by an inner combustor casing of the gas turbine engine and a compressor section of the gas turbine engine.

In some embodiments, the first section may be the high-pressure compressor section 26. In other words, delivering the first flow of cooling air 222 to the first section of the gas turbine engine 12 via the first cooling duct 220 includes delivering the first flow of cooling air 222 to the high-pressure compressor section 26. More particularly, the aft cavity 72 of the high-pressure compressor section 26.

In additional and/or alternative embodiments, the second section of the gas turbine engine 12 may be the high-pressure turbine section 30. Delivering the second flow of cooling air 242 to a second section of the gas turbine engine 12 may refer to providing a portion of cooling air 242 to the high-pressure turbine section 30. More particularly, the second cooling duct 240 may transport the second flow of cooling air 242 to the forward wheelspace cavity 104 of the high-pressure turbine section 30.

Additionally, the method 300 may further include receiving data indicative of an operative condition of the gas turbine engine. Providing at least a portion of the airflow from the cooling duct to the aft cavity (e.g., at 330), may further include providing at least a portion of the airflow from the cooling duct to the aft cavity in response to receiving data indicative of the operative condition of the gas turbine engine. The operative condition may include at least one of the following: a high operating temperature condition; a high-pressure condition; a supersonic cruise condition; and a takeoff condition.

In some embodiments, receiving data indicative of the operative condition includes receiving data indicative of the gas turbine engine being in the operative condition. Further, providing at least the portion of the airflow from the cooling duct to the aft cavity in response to receiving data indicative of the operative condition of the gas turbine engine may include increasing the portion of the airflow provided to the aft cavity in response to receiving the data indicative of the gas turbine engine being in the operative condition.

Additionally, receiving data indicative of the operative condition may include receiving data indicative of the gas turbine engine no longer being in the operative condition.

Providing at least the portion of the airflow from the cooling duct to the aft cavity in response to receiving data indicative of the operative condition of the gas turbine engine may include decreasing the portion of the airflow provided to the aft cavity in response to receiving the data indicative of the gas turbine engine no longer being in the operative condition.

Additionally, the method 300 may further include flowing compressor discharge air 210 from the high-pressure compressor 26 of the gas turbine engine 12. Flowing the compressor discharge air 210 from the high-pressure compressor 26 of the gas turbine engine 12 may occur prior to providing the first flow of cooled air 222 to the first cooling duct 220 and/or prior to providing the second flow of cooled air 242 to the second cooling duct 240. In some embodiments, flowing compressor discharge air 210 from the high-pressure compressor 26 of the gas turbine engine 12 may be triggered by the at least one sensor 245 sensing one or more operative conditions. As mentioned above, one or more operative conditions comprise at least one of the following: high operating temperature; high-pressure; supersonic cruise; and takeoff.

The method 300 may also include cooling the compressor discharge air 210 using a heat exchanger 140 prior to at least one of providing the first flow of cooled air 222 to the first cooling duct 220 and providing the second flow of cooled air 242 to the second cooling duct 240. In at least some embodiments, cooling the compressor discharge air 210 using the heat exchanger 140 occurs after flowing the compressor discharge air 210 from the high-pressure compressor 26. However, it will be appreciated in some embodiments, cooling the compressor discharge air 210 using the heat exchanger 140 may occur simultaneously as flowing the compressor discharge air 210 from the high-pressure compressor 26, e.g., where the heat exchanger 140 cools the compressor discharge air 210 while at least some of the compressor discharge air downstream is still flowing out from the compressor section 23 into the heat exchanger 140.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine comprising: a compressor section comprising a compressor; a combustion section comprising an outer combustor casing and an inner combustor casing, the inner combustor casing defining in part an aft cavity with the compressor section and defining in part a diffuser cavity with the outer combustor casing; and a cooling system for cooling at least part of the gas turbine engine, the cooling system comprising: a compressor discharge pressure duct positioned in fluid communication with the diffuser cavity, the compressor section, or both for receiving an airflow from the diffuser cavity, from the compressor section, or both; a heat exchanger in thermal communication with the compressor discharge pressure duct for reducing a temperature of the airflow; a cooling duct located inward of the outer combustor casing and in fluid communication with the compressor discharge pressure duct and the aft cavity for receiving the airflow and providing at least a portion of the airflow to the aft cavity, the cooling duct including a manifold extending in a circumferential direction of the gas turbine engine.

The gas turbine engine of one or more of the preceding clauses, wherein the cooling duct is a first cooling duct, and wherein the gas turbine engine further comprises: a turbine section, wherein the cooling system further comprises a second cooling duct in fluid communication with the compressor discharge pressure duct and further in fluid communication with the turbine section.

The gas turbine engine of one or more of the preceding clauses, wherein the compressor comprises a material, wherein the material defines a material temperature limit in degrees Fahrenheit, and wherein cooling system is configured to provide the airflow to the diffuser cavity at a temperature in degrees Fahrenheit less than or equal to 85% of material temperature limit when the gas turbine engine is operated at a rated speed during standard day operating conditions.

The gas turbine engine of one or more of the preceding clauses, wherein the turbine section comprises a high-pressure turbine, wherein the second cooling duct is in fluid communication with the high-pressure turbine of the turbine section.

The gas turbine engine of one or more of the preceding clauses, wherein the high-pressure turbine comprises an inlet guide vane and a first stage blade, wherein the inlet guide vane and the first stage blade define a forward wheelspace cavity, and wherein the gas turbine engine defines a purge air flowpath from the aft cavity to the forward wheelspace cavity.

The gas turbine engine of one or more of the preceding clauses, the cooling system further comprising: at least one sensor for sensing data indicative of an operative condition of the gas turbine engine; and at least one valve in fluid communication with the cooling duct, wherein the at least one valve is configured to operate based on the operative condition.

The gas turbine engine of one or more of the preceding clauses, wherein the operative condition comprises at least one of: a high operating temperature condition; a high-pressure condition; a supersonic cruise condition; a takeoff condition; or a climb condition.

The gas turbine engine of one or more of the preceding clauses, wherein the operative condition is the high operating temperature condition, and wherein the high operating temperature comprises an operating condition wherein a compressor exit temperature is higher than 1000 degrees Fahrenheit.

The gas turbine engine of one or more of the preceding clauses, further comprising a controller in operable communication with the at least one sensor and the at least one valve the controller configured to receive data indicative of the operative condition from the at least one sensor and control the at least one valve to provide at least the portion of the airflow from the cooling duct to the aft cavity in response to receiving the data indicative of the operative condition of the gas turbine engine.

The gas turbine engine of one or more of the preceding clauses, wherein the cooling system further comprises a controller operably coupled to the at least one sensor for receiving the data indicative of the operative condition and the at least one valve for actuating the at least one valve, wherein the controller is configured to move the at least one valve to an open position when the gas turbine engine is in the operative condition and is further configured to move the at least one valve to a closed position when the gas turbine engine is not in the operative condition.

The gas turbine engine of one or more of the preceding clauses, wherein the cooling duct is a first cooling duct, wherein the cooling system further comprises a second cooling duct in fluid communication with the compressor discharge pressure duct.

The gas turbine engine of one or more of the preceding clauses, wherein the manifold comprises two segments, wherein each of the two segments extends 180 degrees.

The gas turbine engine of one or more of the preceding clauses, wherein the heat exchanger is positioned outside of the outer combustor casing.

The gas turbine engine of one or more of the preceding clauses, wherein the compressor discharge pressure duct is in fluid communication with the diffuser cavity for receiving the airflow.

A method of cooling one or more sections in a gas turbine engine, the method comprising: receiving an airflow from a diffuser cavity defined by an outer combustor casing of the gas turbine engine; cooling the airflow received from the diffuser cavity with a heat exchanger; providing the airflow from the heat exchanger to an aft cavity defined at least in part by an inner combustor casing of the gas turbine engine and a compressor section of the gas turbine engine; and providing at least a portion of the airflow from the cooling duct to a turbine section of the gas turbine engine.

The method of one or more of the preceding clauses, further comprising: receiving data indicative of an operative condition of the gas turbine engine, wherein providing at least a portion of the airflow from the cooling duct to the aft cavity comprises providing at least a portion of the airflow from the cooling duct to the aft cavity in response to receiving data indicative of the operative condition of the gas turbine engine.

The method of one or more of the preceding clauses, wherein the operative condition comprises at least one of: a high operating temperature condition; a high-pressure condition; a supersonic cruise condition; or a takeoff condition.

The method of one or more of the preceding clauses, wherein receiving data indicative of the operative condition comprises receiving data indicative of the gas turbine engine being in the operative condition, and wherein providing at least the portion of the airflow from the cooling duct to the aft cavity in response to receiving data indicative of the operative condition of the gas turbine engine comprises increasing the portion of the airflow provided to the aft cavity in response to receiving the data indicative of the gas turbine engine being in the operative condition.

The method of one or more of the preceding clauses, wherein receiving data indicative of the operative condition comprises receiving data indicative of the gas turbine engine no longer being in the operative condition, and wherein providing at least the portion of the airflow from the cooling duct to the aft cavity in response to receiving data indicative of the operative condition of the gas turbine engine comprises decreasing the portion of the airflow provided to the aft cavity in response to receiving the data indicative of the gas turbine engine no longer being in the operative condition.

The method of one or more of the preceding clauses, wherein providing the airflow from the heat exchanger to the aft cavity comprises providing the airflow from the heat exchanger to a cooling duct located inward of the outer combustor casing and providing at least a portion of the airflow from the cooling duct to the aft cavity.

A gas turbine engine comprising: a compressor section comprising a compressor; a combustion section comprising an outer combustor casing and an inner combustor casing, the inner combustor casing defining in part an aft cavity with the compressor section and defining in part a diffuser cavity with the outer combustor casing; and a cooling system for cooling at least part of the gas turbine engine, the cooling system comprising: a sensor for sensing data indicative of an operative condition of the gas turbine engine; a compressor discharge pressure duct positioned in fluid communication with the diffuser cavity, the compressor section, or both for receiving an airflow from the diffuser cavity, from the compressor section, or both; a heat exchanger in thermal communication with the compressor discharge pressure duct; a cooling duct located inward of the outer combustor casing and in fluid communication with the compressor discharge pressure duct and the aft cavity; and a valve in fluid communication with the cooling duct configured to operate based on the operative condition.

We claim:
1. A gas turbine engine comprising:
a compressor, a combustion section, and a turbine arranged in serial flow,
wherein the combustion section comprises an outer combustor casing and an inner combustor casing defining at least in part a diffuser cavity therebetween,
wherein the compressor is in fluid communication with the diffuser cavity to provide a flow of compressed air from the compressor to the diffuser cavity;
a high-pressure shaft disposed radially inward from the inner combustor casing,
wherein the high-pressure shaft and the inner combustor casing at least partially define an aft cavity and a forward shaft outer cavity therebetween,
wherein a seal extends from the high pressure shaft to the inner combustor casing to separate the aft cavity from the forward shaft outer cavity, and
wherein the aft cavity is defined at least in part by the inner combustor casing, the seal, and the compressor; and
a cooling system, comprising:
a heat exchanger fluidly coupled to the diffuser cavity via a first fluid opening,
wherein the heat exchanger receives airflow from the diffuser cavity via the first fluid opening;
a first cooling duct fluidly coupling the heat exchanger to the aft cavity, wherein the first cooling duct includes a first pipe and a manifold extending in a circumferential direction from the first pipe about a longitudinal centerline of the gas turbine engine, the first pipe and the manifold extending through the diffuser cavity downstream from the heat exchanger;
a valve disposed within the first cooling duct downstream from the manifold and upstream from the aft cavity; and
a second cooling duct fluidly coupling the heat exchanger to the turbine via the forward shaft outer cavity, and
wherein the second cooling duct extends within the diffuser cavity.

2. The gas turbine engine of claim 1, wherein the turbine of the gas turbine engine is part of a turbine section of the gas turbine engine, wherein the second cooling duct provides a portion of the airflow to the turbine of the turbine section.

3. The gas turbine engine of claim 2, wherein the compressor comprises a material, wherein the material defines a material temperature limit in degrees Fahrenheit, and wherein the cooling system is configured to provide another portion of the airflow to the aft cavity at a temperature in degrees Fahrenheit less than or equal to 85% of the material temperature limit when the gas turbine engine is operated at a rated speed during standard day operating conditions.

4. The gas turbine engine of claim 2, wherein the turbine of the turbine section is a high-pressure turbine.

5. The gas turbine engine of claim 4, wherein the high-pressure turbine comprises an inlet guide vane and a first stage blade, wherein the inlet guide vane and the first stage blade define a forward wheelspace cavity, and wherein the gas turbine engine defines a purge air flowpath from the aft cavity to the forward wheelspace cavity.

6. The gas turbine engine of claim 1, the cooling system further comprising: at least one sensor for sensing data indicative of an operative condition of the gas turbine engine, wherein the valve is configured to operate based on the operative condition.

7. The gas turbine engine of claim 6, wherein the operative condition comprises at least one of: a high operating temperature condition; a high-pressure condition; a supersonic cruise condition; a takeoff condition; or a climb condition.

8. The gas turbine engine of claim 7, wherein the operative condition is the high operating temperature condition, and wherein the high operating temperature comprises an operating condition wherein a compressor exit temperature is higher than 1000 degrees Fahrenheit.

9. The gas turbine engine of claim 6, further comprising a controller, the controller comprising one or more computing devices in operable communication with the at least one sensor and the valve, the one or more computing devices of the controller being configured to receive the data indicative of the operative condition from the at least one sensor and control the valve to provide a portion of the airflow from the first cooling duct to the aft cavity in response to receiving the data indicative of the operative condition of the gas turbine engine.

10. The gas turbine engine of claim 6, wherein the cooling system further comprises a controller, the controller comprising one or more computing devices operably coupled to the at least one sensor, for receiving the data indicative of the operative condition, and to the valve, for actuating the valve, wherein the one or more computing devices of the controller are configured to move the valve to an open position when the gas turbine engine is in the operative condition and are further configured to move the valve to a closed position when the gas turbine engine is not in the operative condition.

11. The gas turbine engine of claim 1, wherein the manifold is divided into two segments, wherein each of the two segments extends 180 degrees about the longitudinal centerline of the gas turbine engine.

12. The gas turbine engine of claim 1, wherein the heat exchanger is positioned outside of the outer combustor casing.

13. The gas turbine engine of claim 1, wherein the heat exchanger is fluidly coupled to the diffuser cavity via a compressor discharge pressure duct.

14. A method of cooling one or more sections in a gas turbine engine, the method comprising:

receiving an airflow from a diffuser cavity defined by an outer combustor casing and an inner combustor casing of the gas turbine engine;

cooling the airflow received from the diffuser cavity with a heat exchanger;

providing a first portion of the airflow from the heat exchanger to a first cooling duct at least partially defined by a first pipe extending within the diffuser cavity and providing a second portion of the airflow from the heat exchanger to a second cooling duct at least partially defined by a second pipe extending within the diffuser cavity, the first cooling duct including a manifold within the diffuser cavity and extending in a circumferential direction from the first pipe about a longitudinal centerline of the gas turbine engine; and providing the first portion of the airflow from the first cooling duct to an aft cavity defined at least in part by:
the inner combustor casing,
a seal that extends from a high-pressure shaft of the gas turbine engine to the inner combustor casing, and
a compressor section of the gas turbine engine; and providing the second portion of the airflow from the second cooling duct to a turbine section of the gas turbine engine, wherein providing the first portion of the airflow from the first cooling duct to the aft cavity comprises operating at least one valve located downstream of the manifold and upstream from the aft cavity and in fluid communication with the first cooling duct.

15. The method of claim 14, further comprising: receiving data indicative of an operative condition of the gas turbine engine, wherein providing the first portion of the airflow from the first cooling duct to the aft cavity comprises providing the first portion of the airflow from the first cooling duct to the aft cavity in response to receiving the data indicative of the operative condition of the gas turbine engine.

16. The method of claim 15, wherein the operative condition comprises at least one of: a high operating temperature condition; a high-pressure condition; a supersonic cruise condition; or a takeoff condition.

17. The method of claim 15, wherein receiving the data indicative of the operative condition comprises receiving data indicating that the gas turbine engine is in the operative condition, and wherein providing the first portion of the airflow from the first cooling duct to the aft cavity in response to receiving the data indicative of the operative condition of the gas turbine engine comprises increasing the first portion of the airflow provided to the aft cavity in response to receiving the data indicating that the gas turbine engine is in the operative condition.

18. The method of claim 15, wherein receiving the data indicative of the operative condition comprises receiving data indicating that the gas turbine engine is no longer in the operative condition, and wherein providing the first portion of the airflow from the cooling duct to the aft cavity in response to receiving the data indicative of the operative condition of the gas turbine engine comprises decreasing the first portion of the airflow provided to the aft cavity in response to receiving the data indicating that the gas turbine engine is no longer in the operative condition.

* * * * *